United States Patent [19]

Booth

[11] 4,190,500
[45] Feb. 26, 1980

[54] SODIUM ION CONDUCTING SODIUM ALUMINUM BORATE GLASSES

[75] Inventor: Charles L. Booth, Wilmington, Del.

[73] Assignee: E. I. du Pont de Nemours and Company, Wilmington, Del.

[21] Appl. No.: 916,915

[22] Filed: Jun. 19, 1978

[51] Int. Cl.² .................................................. H01M 6/18
[52] U.S. Cl. .................................. 204/1 R; 204/195 G;
204/195 S; 204/242; 429/104; 429/193
[58] Field of Search ................ 429/191, 193, 104, 50;
204/1 R, 195 G, 195 S, 295; 106/52, 54

[56] References Cited
U.S. PATENT DOCUMENTS

| 3,143,488 | 8/1964 | Arthur et al. | 204/195 G |
| 3,476,602 | 11/1969 | Brown et al. | 429/104 |
| 3,829,331 | 8/1974 | Tsang | 429/193 |
| 3,905,792 | 9/1975 | Trap | 106/54 |
| 4,002,807 | 1/1977 | Ludwig | 429/104 |

OTHER PUBLICATIONS

Roe, New Glass Compositions Possessing Electronic Conductivities Journal of Electrochemical Society, vol. 112, No. 10, pp. 1005–1009, (1965).

Primary Examiner—Donald L. Walton

[57] ABSTRACT

Certain sodium aluminum borate glasses containing about 2–11 mole percent of $ZrO_2$, $P_2O_5$ or $SiO_2$ are good ionic conductors and are resistant to corrosion by molten sodium at about 300° C. Exemplary is a glass consisting of 46 mole percent $Na_2O$, 46 mole percent $B_2O_3$, 8 mole percent $Al_2O_3$, 3.3 mole percent $P_2O_5$ and 3.3 mole percent of $ZrO_2$.

29 Claims, 1 Drawing Figure

SODIUM ION CONDUCTING SODIUM ALUMINUM BORATE GLASSES

DESCRIPTION

1. Technical Field

This invention relates to the discovery that certain glasses in the $Na_2O$-$B_2O_3$-$Al_2O_3$ system are good sodium ion conductors and are useful as solid electrolytes in electrochemical devices.

2. Background Art

Solid ionic conductors with $Na^+$ as the mobile species are desirable for use as solid electrolytes.

Sodium has long been regarded as a desirable component of galvanic cells. It is inexpensive and its high reduction potential and light weight have often suggested its use as the anodic component in high energy-density storage batteries. $Na^+$ conductors such as $\beta$-$Al_2O_3$ which are solid and are highly conductive at low temperatures are quite useful in such utilities; these conductors also serve to separate the anodic and cathodic components. (See, for example, J. T. Kummer, Prog. in Solid State Chem., 7, 141 (1972), J. T. Kummer and N. Weber, "A Sodium-Sulfur Secondary Battery" SAE paper No. 670179, Jan. 1967, and L. S. Marcoux and E. T. Seo, "Sodium-Sulfur Batteries", in Amer. Chem. Soc. Monograph on New Uses of Sulfur, 1975).

Solid electrolytes are also useful in other electrochemical cells. In the electrowinning of sodium metal from a dissociable molten salt such as $NaCl$-$AlCl_3$ or $Na_xS_y$, $Na^+$ ions are electrically transported from the molten salt through the solid electrolyte and converted to elemental sodium at the cathode. In purifying sodium contained in a molten alloy, such as sodium amalgam or other source of impure sodium, sodium ions are produced at the anode and are electrically attracted through a solid electrolyte. The ions are then deposited at the cathode as pure elemental sodium.

Brown et al. U.S. Pat. No. 3,476,602 have disclosed a rechargeable Na-S battery in which the solid electrolyte consists of fine hollow fibers made of glass, glass-ceramics, etc. Silicate glasses of the formula $Na_2O.3SiO_2$, borate glasses of the type $Na_2O.2B_2O_3$ containing up to 0.5 NaF or 0.15 NaCl or NaBr and borosilicate glasses of the type $2Na_2O.4SiO_2.B_2O_3$ have been proposed for such use. These glasses however are subject to cracking and pitting which greatly reduce the operating life of the battery.

Levine et al., U.S. Pat. No. 3,663,294 propose to increase the operating life of such a battery by using a molten polysulfide catholyte which has a low hydroxide content and thus reduce attack on the glass electrolyte.

The present invention increases the operating life of such a battery by utilizing a special kind of glass which is highly resistant to corrosion under the operating conditions of the battery.

DISCLOSURE OF INVENTION

It has now been discovered that sodium aluminum borate glasses with compositions corresponding to points that lie within the quadrilateral ABCD region of the $Na_2O$, $B_2O_3$ and $Al_2O_3$ ternary diagram of FIG. 1 where the mole percent of the compositions corresponding to the corners of the quadrilateral are

|   | $Na_2O$ | $B_2O_3$ | $Al_2O_3$ |
|---|---------|----------|-----------|
| A | 52      | 43       | 5         |
| B | 42      | 33       | 25        |
| C | 33      | 42       | 25        |
| D | 43      | 52       | 5         | and containing additions of about 2 to 11 mole percent of at least one of $ZrO_2$, $MgO$, $P_2O_5$ and $SiO_2$ are good ionic conductors and are resistant to corrosion by molten sodium and sulfur at about 300° C. This invention provides a method for conducting sodium ions utilizing a glass of this composition.

This invention also provides an electrochemical device having (a) two electrodes, one of which is a sodium-containing electrode capable of supplying sodium ions, (b) a solid electrolyte separating the two electrodes and (c) an inert connecting electrical connector to complete an electrical circuit between the two electrodes wherein the solid electrolyte consists essentially of the aforementioned sodium ion conducting glasses.

As used in the battery cell, the glass electrolyte can be in the form of thin membranes fabricated in various orientations. These membranes can be in the form of flat plates, corrugated sheets, spirals or other designs which during operation will provide for anode metal ion transfer but will keep separate the liquid anode and cathode materials.

A preferred form for the electrolyte is fine, hollow glass fibers wherein the individual fibers have an outside diameter wall thickness ratio of at least 3, ordinarily from about 3 to about 20 and preferably from about 4 to about 10. Usually within these ratios, fibers having an outside diameter from about 20 to about 1000 microns and a wall thickness of from about 5 to about 100 microns are used. Such hollow fibers provide a high strength, thin walled membrane and give a high ion conductivity. They also provide a very large surface area to volume ratio. Although less advantageous in the latter respect, fibers as large as 5000 microns outside diameter and having walls as thick as 1000 microns can be employed.

For use in a battery cell, the hollow fibers can be fabricated into bundles of circular, rectangular prismatic or other geometric cross-sectional shapes which provide for a controlled orientation and substantially uniform spacing between fibers. The actual fabrication of the electrolyte fibers into a predetermined configuration readily can be carried out by one skilled in the art using known handling, packing and fabricating techniques. To illustrate, bundles of the fibers each having one end closed can be prepared wherein the open ends of the fibers are passed through and sealed into a common header which in turn either serves as or communicates with a reservoir for anode metal.

These hollow fibers can be sealed in place as a bundle in a header, for example, by adhesives such as glazing or potting compounds, solder glass, high temperature thermosetting resins and the like materials.

Preferred are Na-S batteries in which the solid electrolyte consists of sealed hollow fibers which contain sodium.

Figure 1:
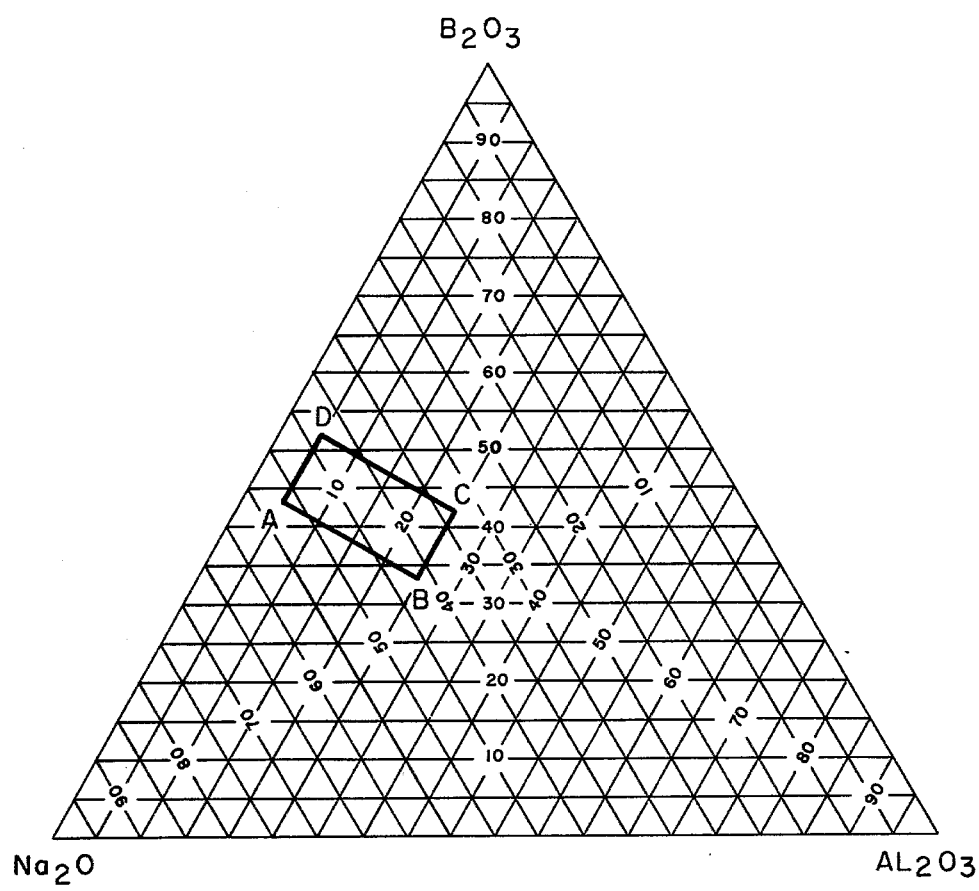
FIG. 1 shows the ternary diagram $Na_2O$-$B_2O_3$-$Al_2O_3$ and the region ABCD of the diagram which corresponds to the $Na_2O/B_2O_3/Al_2O_3$ compositions of the glasses of this invention.

The sodium aluminum borate glasses of this invention have substantial $Na^+$ conductivity. For example, at 300° C. they have conductivities in excess of $5 \times 10^{-5}$ $ohm^{-1} cm^{-1}$ and some have conductivities of the order of $5 \times 10^{-4} ohm^{-1} cm^{-1}$. These glasses are also resistant to corrosion by molten sodium at about 300° C. These properties allow these glasses to be used as solid electrolytes in batteries, coulometers, timers, display devices, and in sodium-winning and sodium-purifying cells. (See M. Voinov, "Various Utilization of Solid Electrolytes" in Electron Processes in Solid State Ionics, Proc. Nato. Adv. Study Institute held in Ajaccio, Corsica, Aug. 23–Sept. 9, 1975, edited by M. Kleitz and J. DuPuy, D. Reidel Publ. Co., Boston (1976)).

The mole percent of the three major components $Na_2O$, $B_2O_3$ and $Al_2O_3$ are chosen so as to always total 100%. Therefore, since at least one of the additives $ZrO_2$, MgO, $P_2O_5$ and $SiO_2$ is present, the total mole percent exceeds 100%. Preferred are the compositions in which the mole percents are approximately 46 $Na_2O$, 46 $B_2O_3$, 8 $Al_2O_3$ and 6–10 of at least one of $ZrO_2$ and $P_2O_5$.

The constituent oxides or their precursors can be used as starting materials to make the glasses. In the examples $NaHCO_3$, $B_2O_3$ and $Al(OH)_3$ were used along with $ZrO_2$, MgO, $SiO_2$ and $(NH_4)_2HPO_4$. However, other equivalent starting materials include nitrates, chlorides or carbonates. The starting materials are weighed and then thoroughly mixed using, for example, an agate mortar and pestle, a Spex ® oscillating-type shaker, or an orbital agate mill. The mixture is then placed in a crucible made from an inert material such as platinum or kyanite. When smaller size crucibles are used the material sometimes bubbles out when heated to melting temperatures. This can be avoided by first calcining the material at a lower temperature of 500° to 1000° C. for about 2 hours to remove volatiles. The crucible is then placed in a furnace and held at temperatures of the order of 1200°–1300° C. until the materials have completely melted. In all compositions of this invention this occurred in less than 16 hours.

After melting, the glass melt is quenched by pouring it onto a steel plate to form a solid glass. In some cases the thermal shock is sufficient to crack the glass into pieces that are too small to test. These samples were repeated and the glass melt slow cooled from an appropriate temperature to remove stresses. The solid glass was then cut or ground to a size that was convenient for testing.

No water was used on the samples at any time. Any water in or on the glass is likely to react with the molten sodium in any electrochemical device and decrease the corrosion resistance and conductivity of the samples. Lapping oil was used to cut and polish samples and the residual oil was removed with a methanol rinse. The samples were all vacuum baked at or above 150° C. for at least 16 hours prior to any testing.

X-ray diffraction patterns were taken to verify that the product was indeed a glass. A sample of glass was powdered and passed through a 325 mesh screen and submitted for Norelco x-ray diffraction using copper $K\alpha$ radiation. The detector was run at a sensitivity of 500 counts full scale with a time constant of 3. Chart speed or diffractometer speed was 1° of $2\theta$/min. Lack of crystallinity was indicated by no recognizable or identifiable peaks in the pattern.

To determine conductivity, samples were prepared in the form of a rectangular prism or cylinder, with typical dimensions of about 0.5 cm for easy handling. The sample was mounted in a stainless steel holder between two disks of sodium foil 0.015" thick supported on nickel screens and the sample temperature was raised above the melting point of sodium metal to assure good contact. The a-c conductance was measured using a Wayne-Kerr Universal bridge at a frequency of $10^4$ radians/second. The dc conductivity was checked by applying slowly varying voltages (triangular wave forms with a frequency less than 0.01 hz) and recording the current. The dc conductivity was calculated from the current-voltage plot. Excellent agreement with the ac results were obtained. Upon removal of the sample, the sodium was cleaned from the glass and no apparent attack by the molten sodium was evident. Final traces of sodium were removed by using a methanol rinse.

In order to further verify resistance to sodium corrosion, glass samples were weighed to four significant figures on an analytical balance and then placed in quartz tubes. The tubes were loaded with molten sodium at 280° C. and the glass samples allowed to soak in the molten sodium for 48 hours. The samples were cooled and rinsed with methanol to remove excess sodium. The samples were then weighed and were judged to have sufficient sodium corrosion resistance if the weight loss was less than 0.3 wt. %. In some cases sodium was not removed with the standard methanol rinse. In those cases an ultrasonic rinse was used for 10 minutes to remove the excess sodium. A sodium buildup less than 0.5 wt. % was judged not detrimental. The glasses of this invention fall within these limits of weight loss.

The glasses of this invention are useful as the solid electrolytes in electrochemical devices having two electrodes one of which is a sodium-containing electrode capable of supplying sodium ions. Since glasses are readily cast in a variety of forms, the glasses of this invention are especially useful in devices in which the solid electrolytes must be in a form which is difficult to make with non-glasses, e.g., the fine hollow tubes of the Brown U.S. 3,476,602 batteries.

BEST MODE

The best mode of practicing the invention is exemplified by the procedure used in Example 4.

EXAMPLES 1-6

The amounts of starting materials $NaHCO_3$, $B_2O_3$, $Al(OH)_3$ and $ZrO_2$, MgO, $SiO_2$ and $(NH_4)_2HPO_4$ used in preparation of each of these Examples are shown in Table I. The starting materials were thoroughly mixed and then placed in a platinum or kyanite crucible as indicated in Table I. If the mixture was calcined before melting, the calcining temperature is also indicated as in Table II. Calcining time was about 2 hours. The crucible and contents were heated to the melting temperature given in Table II and held at this temperature until the materials had melted completely. In all examples the time required was less than 16 hours. For Examples 1, 2, 3, 4 and 6, the glass melt was poured onto a steel plate to quench it into a solid piece. Example 5 was slow-cooled from 500° C. to relieve stresses and avoid cracking of the glass.

X-ray diffraction measurements were done on the product glasses to verfiy that they were indeed glasses, i.e. no indentifiable peaks were found. The mole percent of each of the constituent oxides is given in Table III and the results of Na+ conductivity and corrosion resistance measurements described above are given in Table IV.

TABLE I

| | | Starting Materials - grams | | | | |
|---|---|---|---|---|---|---|
| Ex. | NaHCO$_3$ | B$_2$O$_3$ | Al(OH)$_3$ | (NH$_4$)$_2$HPO$_4$ | ZrO$_2$ | MgO | SiO$_2$ |
| 1 | 17.27 | 7.156 | 7.998 | 2.3144 | — | — | — |
| 2 | 17.398 | 7.2088 | 8.5018 | — | — | 0.2197 | 0.6549 |
| 3 | 17.73 | 7.347 | 8.186 | — | — | — | 0.7634 |
| 4 | 79.43 | 32.91 | 12.47 | 9.60 | 4.48 | — | — |
| 5 | 16.382 | 6.788 | 2.574 | 1.981 | 1.848 | — | — |
| 6 | 75.28 | 31.19 | 11.70 | 9.15 | 8.48 | — | — |

TABLE II

| Ex. | Crucible | Calcine Temp. °C. | Melting Temp. °C. |
|---|---|---|---|
| 1 | Pt | 500 | 1200 |
| 2 | Pt | 500 | 1200 |
| 3 | Pt | 500 | 1200 |
| 4 | Pt | — | 1200 |
| 5 | Pt | 900 | 1300 |
| 6 | Kyanite | — | 1200 |

TABLE III

| | Constituent Oxides-Mole Percent | | | | | | |
|---|---|---|---|---|---|---|---|
| Ex. | Na$_2$O | B$_2$O$_3$ | Al$_2$O$_3$ | P$_2$O$_5$ | ZrO$_2$ | MgO | SiO$_2$ |
| 1 | 40 | 40 | 20 | 3.3 | — | — | — |
| 2 | 40 | 40 | 20 | — | — | 2 | 4 |
| 3 | 40 | 40 | 20 | — | — | — | 4.6 |
| 4 | 46 | 46 | 8 | 3.3 | 3.3 | — | — |
| 5 | 46 | 46 | 8 | 3.2 | 6.4 | — | — |
| 6 | 46.6 | 46.6 | 6.8 | 3.9 | 6.2 | — | — |

TABLE IV

| Ex. | % Weight Change-Corrosion Test | $\sigma_{Na^+}$ 300° C. ohm$^{-1}$cm$^{-1}$ |
|---|---|---|
| 1 | +0.02 | 220 × 10$^{-6}$ |
| 2 | −0.02 | 77 × 10$^{-6}$ |
| 3 | +0.03 | 340 × 10$^{-6}$ |
| 4 | 0 | 480 × 10$^{-6}$ |
| 5 | — | 500 × 10$^{-6}$ |
| 6 | +0.19 | 250 × 10$^{-6}$ |

I claim:

1. Method comprising electrically conducting sodium ions through a glass whose components lie within the area of the quadrilateral ABCD of the Na$_2$O, B$_2$O$_3$ and Al$_2$O$_3$ ternary diagram of FIG. 1 where the points A, B, C and D are defined by the mole percentages:

| | Na$_2$O | B$_2$O$_3$ | Al$_2$O$_3$ |
|---|---|---|---|
| A | 52 | 43 | 5 |
| B | 42 | 33 | 25 |
| C | 33 | 42 | 25 |
| D | 43 | 52 | 5 | the mole percentages of the components within the quadrilateral totaling 100%, said glass containing additionally about 2 to 11 mole percent of at least one of ZrO$_2$, MgO, P$_2$O$_5$ and SiO$_2$.

2. The method of claim 1 wherein the glass has 46 mole percent Na$_2$O, 46 mole percent B$_2$O$_3$, 8 mole percent Al$_2$O$_3$ and 6–10 mole percent of at least one of ZrO$_2$ and P$_2$O$_5$.

3. The method of claim 1 wherein the glass has mole percentages of Na$_2$O, B$_2$O$_3$ and Al$_2$O$_3$ of 52, 43 and 5 respectively.

4. The method of claim 1 wherein the glass has mole percentages of Na$_2$O, B$_2$O$_3$ and Al$_2$O$_3$ of 42, 33 and 25 respectively.

5. The method of claim 1 wherein the glass has mole percentages of Na$_2$O, B$_2$O$_3$ and Al$_2$O$_3$ of 33, 42 and 25 respectively.

6. The method of claim 1 wherein the glass has mole percentages of Na$_2$O, B$_2$O$_3$ and Al$_2$O$_3$ of 43, 52 and 5 respectively.

7. The method of claim 1 wherein the glass has the mole percentages:
Na$_2$O—40
B$_2$O$_3$—40
Al$_2$O$_3$—20
P$_2$O$_5$—3.3

8. The method of claim 1 wherein the glass has the mole percentages:
Na$_2$O—40
B$_2$O$_3$—40
Al$_2$O$_3$—20
MgO—2
SiO$_2$—4

9. The method of claim 1 wherein the glass has the mole percentages:
Na$_2$O—40
B$_2$O$_3$—40
Al$_2$O$_3$—20
SiO$_2$—4.6

10. The method of claim 1 wherein the glass has the mole percentages:
Na$_2$O—46
B$_2$O$_3$—46
Al$_2$O$_3$—8
P$_2$O$_5$—3.3
ZrO$_2$—3.3

11. The method of claim 1 wherein the glass has the mole percentages:
Na$_2$O—46
B$_2$O$_3$—46
Al$_2$O$_3$—8
P$_2$O$_5$—3.2
ZrO$_2$—6.4

12. The method of claim 1 wherein the glass has the mole percentages:
Na$_2$O—46.6
B$_2$O$_3$—46.6
Al$_2$O$_3$—6.8
P$_2$O$_5$—3.9
ZrO$_2$—6.2

13. In an electrochemical device having (a) two electrodes, one of which is a sodium-containing electrode capable of supplying sodium ions, (b) a solid electrolyte separating the two electrodes, and (c) an inert connecting electrical connector to complete an electrical circuit between the two electrodes, the improvement wherein the solid electrolyte consists essentially of a sodium ion conducting glass whose components lie within the area of the quadrilateral ABCD of the $Na_2O$, $B_2O_3$ and $Al_2O_3$ ternary diagram of FIG. 1 where the points A, B, C and D are defined by the following mole percentages:

|   | $Na_2O$ | $B_2O_3$ | $Al_2O_3$ |
|---|---------|----------|-----------|
| A | 52      | 43       | 5         |
| B | 42      | 33       | 25        |
| C | 33      | 42       | 25        |
| D | 43      | 52       | 5         | the mole percentages of the components within the quadrilateral totaling 100%, said glass containing additionally about 2–11 mole percent of at least one of $ZrO_2$, MgO, $P_2O_5$ and $SiO_2$.

14. The device of claim 13 wherein the glass has 46 mole percent $Na_2O$, 46 mole percent $B_2O_3$, 8 mole percent $Al_2O_3$ and 6–10 mole percent of at least one of $ZrO_2$ and $P_2O_5$.

15. The device of claim 13 wherein the glass has mole percentages of $Na_2O$, $B_2O_3$ and $Al_2O_3$ of 52, 43 and 5 respectively.

16. The device of claim 13 wherein the glass has mole percentages of $Na_2O$, $B_2O_3$ and $Al_2O_3$ of 42, 33 and 25 respectively.

17. The device of claim 13 wherein the glass has mole percentages of $Na_2O$, $B_2O_3$ and $Al_2O_3$ of 33, 42 and 25 respectively.

18. The device of claim 13 wherein the glass has mole percentages of $Na_2O$, $B_2O_3$ and $Al_2O_3$ of 43, 52 and 5 respectively.

19. The device of claim 13 wherein the glass has the mole percentages:
$Na_2O$—40
$B_2O_3$—40
$Al_2O_3$—20
$P_2O_5$—3.3

20. The device of claim 13 wherein the glass has the mole percentages:
$Na_2O$—40
$B_2O_3$—40
$Al_2O_3$—20
MgO—2
$SiO_2$—4

21. The device of claim 13 wherein the glass has the mole percentages:
$Na_2O$—40
$B_2O_3$—40
$Al_2O_3$—20
$SiO_2$—4.6

22. The device of claim 13 wherein the glass has the mole percentages:
$Na_2O$—46
$B_2O_3$—46
$Al_2O_3$—8
$P_2O_5$—3.3
$ZrO_2$—3.3

23. The device of claim 13 wherein the glass has the mole percentages:
$Na_2O$—46
$B_2O_3$—46
$Al_2O_3$—8
$P_2O_5$—3.2
$ZrO_2$—6.4

24. The device of claim 13 wherein the glass has the mole percentages:
$Na_2O$—46.6
$B_2O_3$—46.6
$Al_2O_3$—6.8
$P_2O_5$—3.9
$ZrO_2$—6.2

25. The device of claim 13 which is an electrolytic cell.

26. The device of claim 13 which is a galvanic cell.

27. The device of claim 13 wherein the anode is sodium and the cathode is sulfur.

28. The device of claim 13 wherein the solid electrolyte is in the form of sealed hollow fibers containing sodium as anode, and the cathode is sulfur.

29. The galvanic cell of claim 26 having the solid electrolyte in the form of sealed hollow fibers containing molten sodium as anode, and molten sulfur as cathode.

* * * * *